(12) United States Patent
Shao et al.

(10) Patent No.: US 9,141,666 B2
(45) Date of Patent: Sep. 22, 2015

(54) INCREMENTAL MAINTENANCE OF RANGE-PARTITIONED STATISTICS FOR QUERY OPTIMIZATION

(71) Applicant: Microsoft Corporation, Redmond, WA (US)

(72) Inventors: Philip Shao, Bellevue, WA (US); Yi Fang, Kirkland, WA (US); Vasileios Papadimos, Seattle, WA (US); Brian Andrew Kirby, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 13/931,470

(22) Filed: Jun. 28, 2013

(65) Prior Publication Data
US 2015/0006509 A1    Jan. 1, 2015

(51) Int. Cl.
*G06F 7/00* (2006.01)
*G06F 17/30* (2006.01)

(52) U.S. Cl.
CPC .... *G06F 17/30442* (2013.01); *G06F 17/30327* (2013.01); *G06F 17/30536* (2013.01)

(58) Field of Classification Search
CPC ............... G06F 17/30463; G06F 17/30442; G06F 17/30545; G06F 17/30474; G06F 17/30306
USPC .......................................................... 707/719
See application file for complete search history.

(56) References Cited

U.S. PATENT DOCUMENTS

| | | | |
|---|---|---|---|
| 5,664,172 A | 9/1997 | Antoshenkov | |
| 6,360,214 B1 | 3/2002 | Ellis et al. | |
| 6,529,901 B1 | 3/2003 | Chaudhuri et al. | |
| 6,625,593 B1 | 9/2003 | Leung et al. | |
| 7,146,365 B2 | 12/2006 | Allen et al. | |
| 7,464,247 B2 | 12/2008 | Uppala | |
| 7,636,731 B2 | 12/2009 | Cruanes et al. | |
| 7,792,822 B2 | 9/2010 | Galindo-Iegaria et al. | |
| 7,882,111 B2 * | 2/2011 | Chien et al. | 707/749 |
| 2008/0071818 A1 * | 3/2008 | Apanowicz et al. | 707/101 |
| 2008/0133458 A1 * | 6/2008 | Zabback et al. | 707/2 |

(Continued)

OTHER PUBLICATIONS

Colgan, Maria, "Maintaining Statistics on Large Partitioned Tables", Published on: Feb. 11, 2009, Available at: http://optimizermagic.blogspot.in/2009/02/maintaining-statistics-on-large.html.

*Primary Examiner* — Robert Beausoliel, Jr.
*Assistant Examiner* — Nicholas Allen
(74) *Attorney, Agent, or Firm* — Nicholas Chen; Doug Barker; Micky Minhas

(57) ABSTRACT

A database management system that manages data in a database includes a query optimizer that performs query optimization based on statistics related to data in the database. The query optimizer incrementally updates the statistics. The query optimizer organizes the statistics related to the data in the database into a statistics tree structure having a root node corresponding to global statistics, internal nodes corresponding to summary statistics of descendant nodes, and leaf nodes corresponding to disjoint data ranges in the database. The query optimizer performs statistics tree transformation operations on the statistics tree structure. The transformation operations transform the statistics tree structure into a form that at least partially minimizes the system resources needed to update the statistics. The query optimizer updates the statistics corresponding to those nodes of the statistics tree structure where a change has occurred in the disjoint data ranges.

20 Claims, 13 Drawing Sheets

(56) References Cited

U.S. PATENT DOCUMENTS

| | | | |
|---|---|---|---|
| 2008/0177694 A1* | 7/2008 | Chaudhuri et al. | 707/2 |
| 2008/0222093 A1* | 9/2008 | Fan et al. | 707/2 |
| 2008/0275840 A1* | 11/2008 | Burger et al. | 707/2 |
| 2009/0327214 A1* | 12/2009 | Richardson et al. | 707/2 |
| 2009/0327217 A1* | 12/2009 | Matias et al. | 707/2 |
| 2010/0049727 A1* | 2/2010 | Balegar et al. | 707/101 |
| 2010/0106713 A1* | 4/2010 | Esuli et al. | 707/716 |
| 2010/0161930 A1* | 6/2010 | Lim et al. | 711/170 |
| 2010/0223253 A1* | 9/2010 | Gopal et al. | 707/713 |
| 2011/0060726 A1* | 3/2011 | Idicula et al. | 707/688 |
| 2011/0125730 A1* | 5/2011 | Bordawekar et al. | 707/718 |
| 2011/0131199 A1* | 6/2011 | Simon et al. | 707/714 |
| 2011/0246503 A1* | 10/2011 | Bender et al. | 707/769 |
| 2011/0252020 A1* | 10/2011 | Lim et al. | 707/721 |
| 2012/0016881 A1* | 1/2012 | Hrle et al. | 707/746 |
| 2012/0060142 A1* | 3/2012 | Fliess et al. | 717/102 |
| 2012/0084287 A1* | 4/2012 | Lakshminarayan et al. | 707/737 |
| 2012/0117054 A1* | 5/2012 | Shrinivas et al. | 707/713 |
| 2012/0117065 A1* | 5/2012 | Nehme et al. | 707/737 |
| 2012/0166423 A1* | 6/2012 | Milby | 707/718 |
| 2012/0166446 A1* | 6/2012 | Bowman et al. | 707/743 |
| 2012/0191639 A1 | 7/2012 | Katahira et al. | |
| 2012/0246189 A1* | 9/2012 | Castellanos et al. | 707/769 |
| 2012/0278305 A1* | 11/2012 | Wei et al. | 707/713 |
| 2012/0330926 A1* | 12/2012 | Rajan et al. | 707/718 |
| 2013/0054582 A1* | 2/2013 | Macklem et al. | 707/723 |

* cited by examiner

900

910
An Act Of An Act Of Determining That A First Disjoint Range Of Data Of The Database Has Been Merged With A Contiguous Second Disjoint Range Of Data Of The Database To Thereby Create A Third Disjoint Range Of Data Of The Database 920
An Act Of Merging A First Leaf Node Corresponding To The First Disjoint Range With A Second Leaf Node Corresponding To The Second Disjoint Range To Thereby Create A Third Leaf Node That Corresponds To One Or More Statistics Related To The Third Disjoint Range

*Figure 9*

INCREMENTAL MAINTENANCE OF RANGE-PARTITIONED STATISTICS FOR QUERY OPTIMIZATION

BACKGROUND

Query optimizers are used to select valid and efficient execution plans for database queries. The query optimizers typically use statistics about the data included in the database. Since the data in the database may change over time, keeping the statistics up-to-date is important so that the query optimizer is able to generate an efficient execution plan. However, existing methods for updating statistics do not allow for efficient ways to incrementally update the statistics.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A database management system that manages data in a database includes a query optimizer that performs query optimization based on statistics related to data in the database. The query optimizer incrementally updates the statistics. The query optimizer organizes the statistics related to the data in the database into a statistics tree structure having a root node corresponding to global statistics, internal nodes corresponding to summary statistics of descendant nodes, and leaf nodes corresponding to disjoint data ranges in the database.

The query optimizer performs statistics tree transformation operations on the statistics tree structure. The transformation operations transform the statistics tree into a form that at least partially minimizes the system resources needed to update the statistics. The query optimizer updates the statistics corresponding to those nodes of the statistics tree structure where a change has occurred in the disjoint data ranges.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 9 illustrates a flowchart of an example method of merging one or more leaf nodes when the disjoint data ranges corresponding to the one or more leaf nodes have been merged;

DETAILED DESCRIPTION

Figure 1:
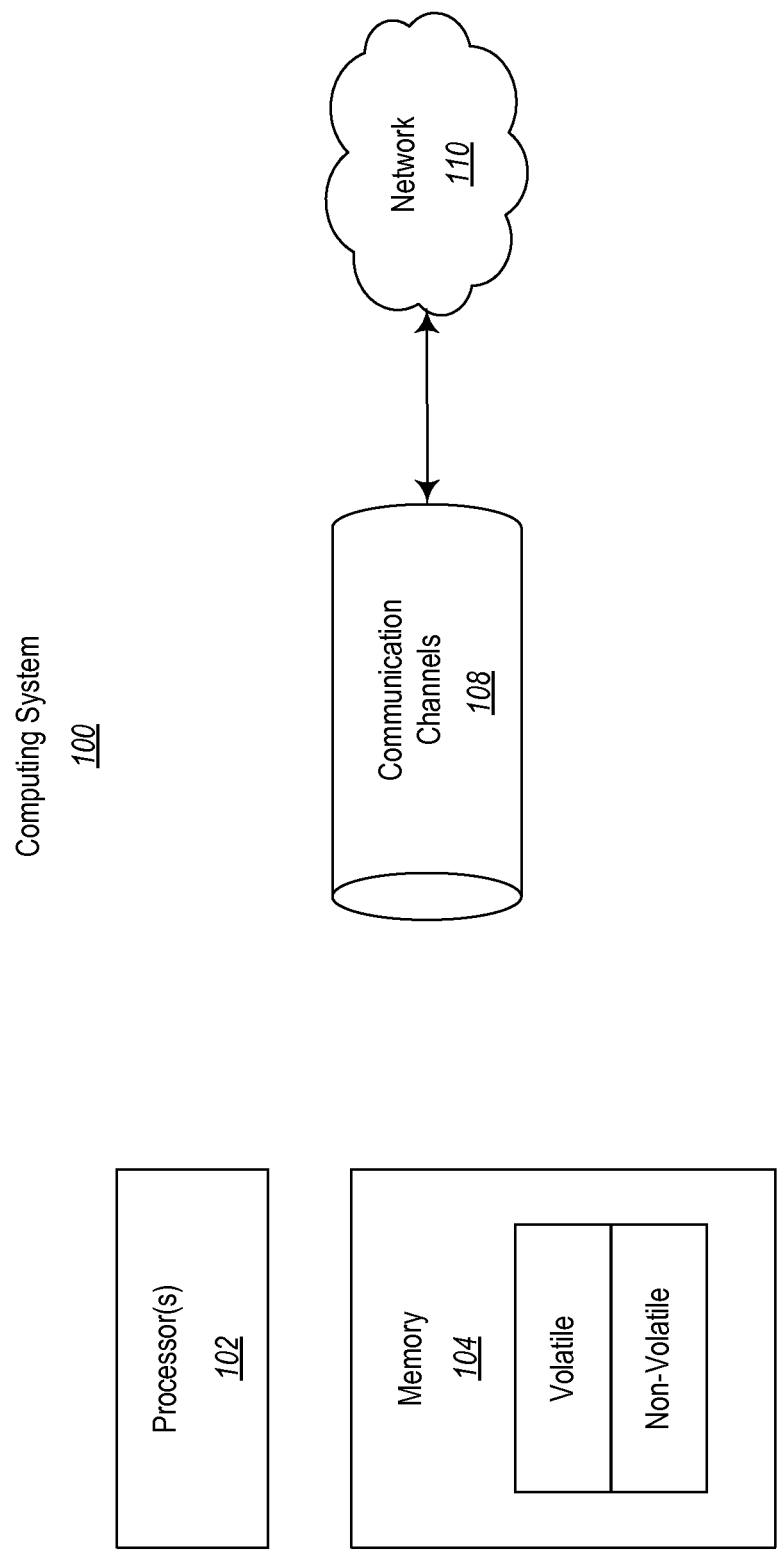
FIG. 1 illustrates a computing system in which some embodiments described herein may be employed.

Data in computing systems is often stored in one or more databases. A database is a collection of related data. Data in the database are commonly organized in a two-dimensional row and column form called a table. A database typically includes multiple tables and multiple associative structures. A table is an object in the database containing zero or more records and at least one field within each record. A record may be embodied as a row in the table that is identified by a unique numeric called a record identifier. A field is a subdivision of a record to the extent that a column of data in the table represents the same field for each record in the table. An example of an associative structure in a database is an index, typically, but not necessarily, a form of B-tree or hash index. Associative structures are transparent to users of a database but are important to efficient operation and control of the database management system. A database management system is a control system that supports database features including, but not limited to, storing data on a memory medium, retrieving data from the memory medium and updating data on the memory medium.

A query is used to access or update data in a database. The query is typically constructed in a variant of Structured Query Language (SQL) that may or may not be compliant with the American National Standards Institute (ANSI) standard SQL definition. A SQL query is non-procedural in that it specifies the objective or desired result of the query in a language meaningful to a user but does not define the steps or procedure by which the query should be accomplished. When a SQL query is applied to a database, a query optimizer of the database management system processes the non-procedural query to create an execution plan. An execution plan is procedural in that it determines the order and type of operations or operators to be performed to carry out the objectives of the SQL query.

The combination of non-procedural queries and procedural execution plans creates both the opportunity and the need for automatic planning of execution plans by the query optimizer. A query optimizer can generate a plurality of different execution plans for any given SQL query and is typically configured to generate an execution plan according to efficiency objectives.

In many cases, the query optimizer uses statistics about the data included in the database. Since the data in the database may change over time, keeping the statistics up-to-date is important so that the query optimizer is able to generate an efficient execution plan.

In accordance with embodiments described herein, a database management system that manages data in a database includes a query optimizer that performs query optimization based on statistics related to data in the database. The query optimizer incrementally updates the statistics. The query optimizer organizes the statistics related to the data in the database into a statistics tree structure having a root node corresponding to global statistics, internal nodes corresponding to summary statistics of descendant nodes, and leaf nodes corresponding to disjoint data ranges in the database.

The query optimizer performs statistics tree transformation operations on the statistics tree. The transformation operations transform the statistics tree into a form that reduces the system resources needed to update the statistics.

One example statistics tree transformation operation merges two or more of the leaf nodes when adjacent disjoint data ranges corresponding to the leaf nodes have been merged. For example, the query optimizer determines that two adjacent disjoint data ranges have been merged to create a new disjoint data range. The query optimizer than merges the leaf nodes corresponding to the merged data ranges to create a new leaf node that corresponds to statistics for the new disjoint data range. In some embodiments, the query optimizer may determine to merge two or more leaf nodes to thereby cause the merger of two or more adjacent or contiguous disjoint ranges of data. This may occur to reduce the amount of data that the database management system needs to maintain.

Another example statistics tree transformation operation uses a cost function to rearrange contiguous ranges of physical partitions among the leaf nodes of the statistics tree structure so that the leaf nodes have approximately equal recomputation costs. For example, the query optimizer may determine a recomputation cost for each of the leaf nodes. Leaf nodes that have a high recomputation cost are split into two or more leaf nodes that have a lower recomputation cost than the leaf node that was split. Leaf nodes that have a low recomputation cost are merged with other low cost leaf nodes to create a new leaf node that has a higher recomputation cost than the leaf nodes that were merged. This process is continued until the leaf nodes have approximately equal recomputation costs.

Another example statistics tree transformation operation balances the statistics tree structure to ensure that the height of the statistics tree structure is logarithmic to the number of nodes in the tree. For example, the query optimizer scans each internal node of the statistics tree structure to determine if the internal nodes have excess leaf nodes when compared to an optimally balanced statistics tree structure. Leaf nodes are removed from those internal nodes that have excess leaf nodes and are added to those internal nodes that have missing leaf nodes.

The query optimizer may then update the statistics corresponding to those nodes of the statistics tree structure where a sufficient number of changes have occurred in the disjoint data ranges.

Some introductory discussion about computing systems will be explained in relation to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other physical, tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
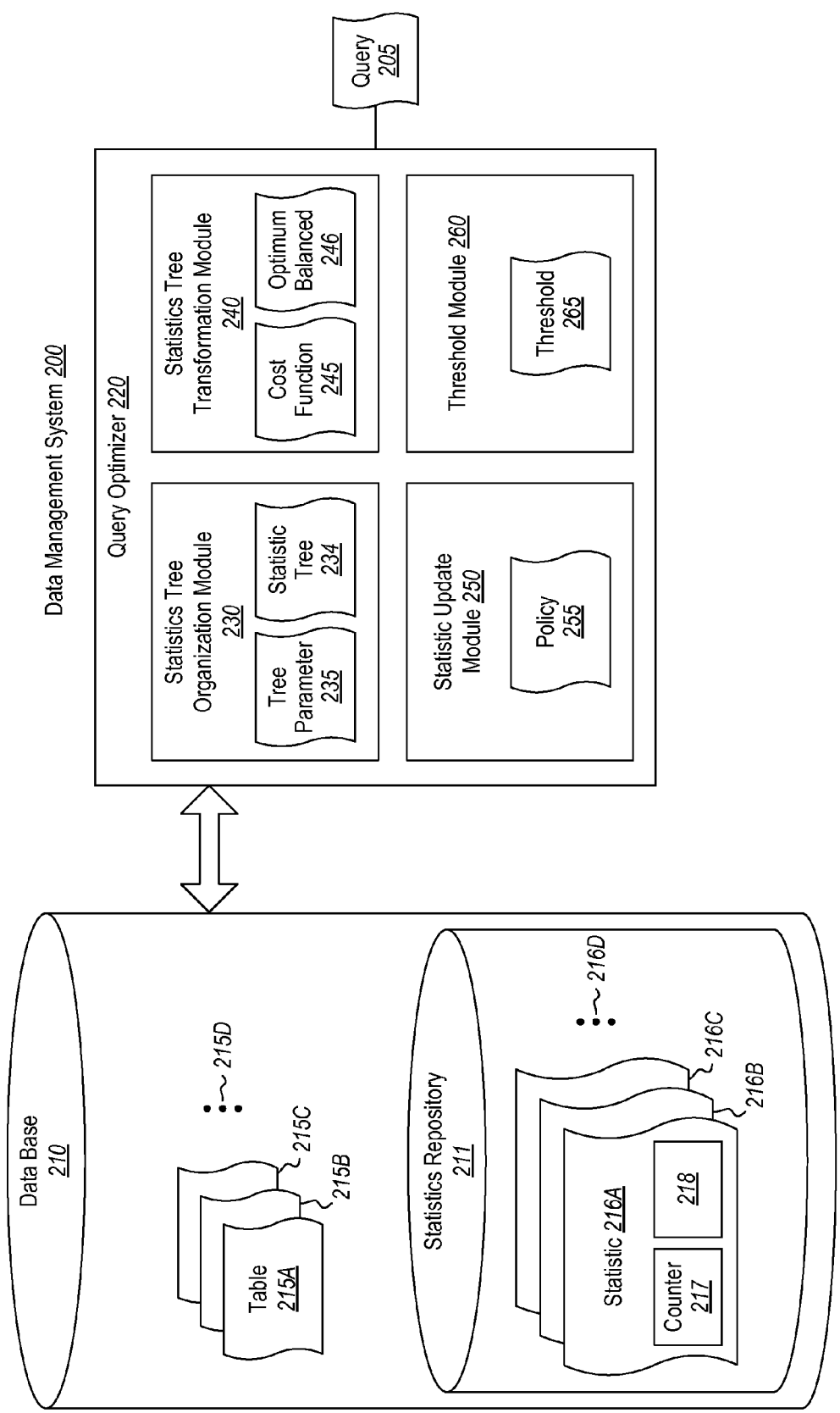
FIG. 2 illustrates an example database management system in which some embodiments described herein may be employed.

Attention is now given to FIG. 2, which illustrates an example database management system 200 in which the embodiments disclosed herein may be practiced. The database management system may be implemented in the computing system of FIG. 1. It will be appreciated that the database management system 200 of FIG. 2 is an example only. Accordingly, the database management system 200 may include more or less than the elements shown in FIG. 2. It will also be appreciated that the elements of database management system 200 may be located on a single computing system or may be distributed across multiple computing systems. Further, the elements of database management system 200 shown in FIG. 2 may be combined as circumstances warrant.

In operation, the database management system 200 is configured to facilitate the access of data stored in a database 210, which may be a relational database. As illustrated, the database 210 includes various data tables 215. FIG. 2 shows a data table 215A, a data table 215B, and a data table 215C. The ellipses 215D illustrate that there can be any number of additional data tables 215, which for a large database 210 may be in the thousands and tens of thousands. Of course, there may be less than three data tables 215. Although not shown, the data tables 215 typically are organized into columns and rows, with data fields being at the intersection of the columns and rows.

Generally, data organized in the data tables 215 stored in the database 210 is accessed by way of a user-defined query 205 that is constructed in a query language such as Structured Query Language (SQL). Typically, for any given SQL query there are numerous procedural operations that need be performed on the data in order to carry out the objectives of the SQL query. For example, there may be numerous joins and table scans that need to be performed so as to accomplish the desired objective. These table joins and scans can often be executed in various different orders to arrive at the same result. A combination of procedural operations which accomplishes the desired objective is referred to as an "execution plan." There may be numerous execution plans that can be developed for any one SQL query 205.

The database management system 200 typically automatically selects one execution plan to implement from the numerous execution plans that may exist for the SQL query 205. One frequently employed criteria for choosing an execution plan is to select the plan which provides the greatest efficiency, i.e. involves minimal use of system resources such as processing cycles and logical I/O's. Generally, a plan that requires processing a minimal number of rows of the data tables 215 also uses minimal system resources. Thus, one key principle for selecting the most efficient execution plan is to select the plan that minimizes the number of rows of the data tables 215 that need to be processed.

Accordingly, the database management system 200 includes a query optimizer 220. In operation, the query optimizer 220 identifies the execution plan that will be the most efficient for the query 205. This identification typically relies on various statistics 216 about the data tables 215.

As illustrated, the data management system 200 includes or has access to a statistics repository 211. In some embodiments, the statistics repository 211 may be part of the database 210 and in other embodiments the statistics repository 211 may be a separate database or other persistent memory.

The statistics repository 211 stores or otherwise persists various statistics 216. FIG. 2 shows a statistic 216A, a statistic 216B, and a statistic 216C. The ellipses 216D illustrate that there can be any number of additional statistics. Of course, there may be less than three statistics 216.

The statistics 216 include information 218 about the data tables 215. The information 218 may be any desirable information about the data tables 215. The information 218 may include, but is not limited to, the number of rows in the data table 215 in which a column is stored; the approximate number of pages occupied by the data stored in a column; the average length of the data stored in the column; the distribution of values in the column (i.e. a histogram); the densities of values in the column; and the number of column values used to produce the histogram and density information.

As will be appreciated, it is often desirable to know when the statistics 216 were last updated. Accordingly, the information 218 may also include information related to when the statistics 216 were last updated. In this way, the query optimizer 220 is able to determine how fresh (i.e., how recently updated) the statistics 216 are.

In some embodiments, the statistics 216 may include a counter 217. The counter 217 may be used to determine the number times that changes have been made to the underlying data table 215 corresponding to the statistics 216. That is, every time a change is made to the data tables 215, the counter 217 increments. This also allows the query optimizer 220 to determine how fresh the statistics 216 are. In an embodiment to be explained in more detail to follow, the counter 217 is used as part of a threshold analysis to determine if any statistic updates are needed.

As will be appreciated, it is necessary for the statistics 216 to be sufficiently fresh when they are used by the query optimizer 220 to identify the most efficient execution plan. If the statistics 216 are not sufficiently fresh, then the information they provide to the query optimizer 220 about the data tables 215 may be outdated, which could lead the selection of an inefficient execution plan.

It will also be appreciated, however, that updating the statistics 216 requires system resources. If there are a large number of statistics 216, then the amount of resources needed to update the statistics, also referred to herein as the cost of updating or a recomputation cost, may be higher than doing a query search without an execution plan. Accordingly, the embodiments disclosed herein provide systems and methods that allow for the incremental update or recomputation of only those statistics whose related or corresponding data table 215 has had sufficient changes made to it since the last update to justify an update.

The query optimizer 220 or some other portion of the database management system 200 includes a statistics tree organization module 230. In operation, the statistics tree organization module 230 organizes the statistics 216 for one or more data tables 215 or for a specific partition of the one or more data tables 215 into a specific statistics tree structure 234 that allows for various statistics tree transformation operations to be performed to thereby minimize the system resources needed to update the statistics 216 as will be explained in more detail to follow.

In one embodiment, when the query optimizer 220 receives the query 205, the query optimizer may access the statistic repository 211 to determine if any of the existing statistics 216 are statistics for the data tables 215 matching the query 205. If so, these existing statistics may be organized into the statistics tree structure 234. If there are not any existing statistics or if there are only some existing statistics, the query optimizer 220 may generate the needed statistics 216 and then organize the generated statistics or the combination of generated and existing statistics into the statistics tree structure 234.

In some embodiments, the statistics tree structure 234 has tree parameters 235 that specify the number of nodes that may be included in the statistics tree structure 234. In one embodiment, the tree parameters 235 may include a parameter CPN that specifies the maximum number of children nodes per internal node. The tree parameters 235 may also include a parameter LC that specifies the maximum number of leaf nodes for the entire statistics tree structure. In one embodiment, CPN may be equal to 2 and LC may be equal to 1000.

The tree parameters 235 are determined based on underlying system resources of the database management system 200 and/or the query optimizer 220. For example, the database management system 200 and/or the query optimizer 220 will implement a merge function to merge nodes and a resample function to resample statistics as will be explained in more detail to follow. The specific merge functions and resample functions used by the database management system 200 and/or the query optimizer 220 are not important to the embodiments disclosed herein as any reasonable merge function and/or any reasonable resample function may be used. However, the type of merge function and/or any resample function may help determine the tree parameters 235.

For example, CPN may be chosen to be high if an implemented merge function scales sublinearly. CPN may be chosen to be low if the implemented merge function scales superlinearly. Likewise, if the implemented merge function is potentially lossy, then choosing a higher CPN may reduce the amount of loss. LC is chosen based on performance criteria of create. So long as the cost of a data table 215 scan is much larger than the cost of a merge, the higher the LC, the faster the incremental update and the slower the initial create.

Figure 3A:
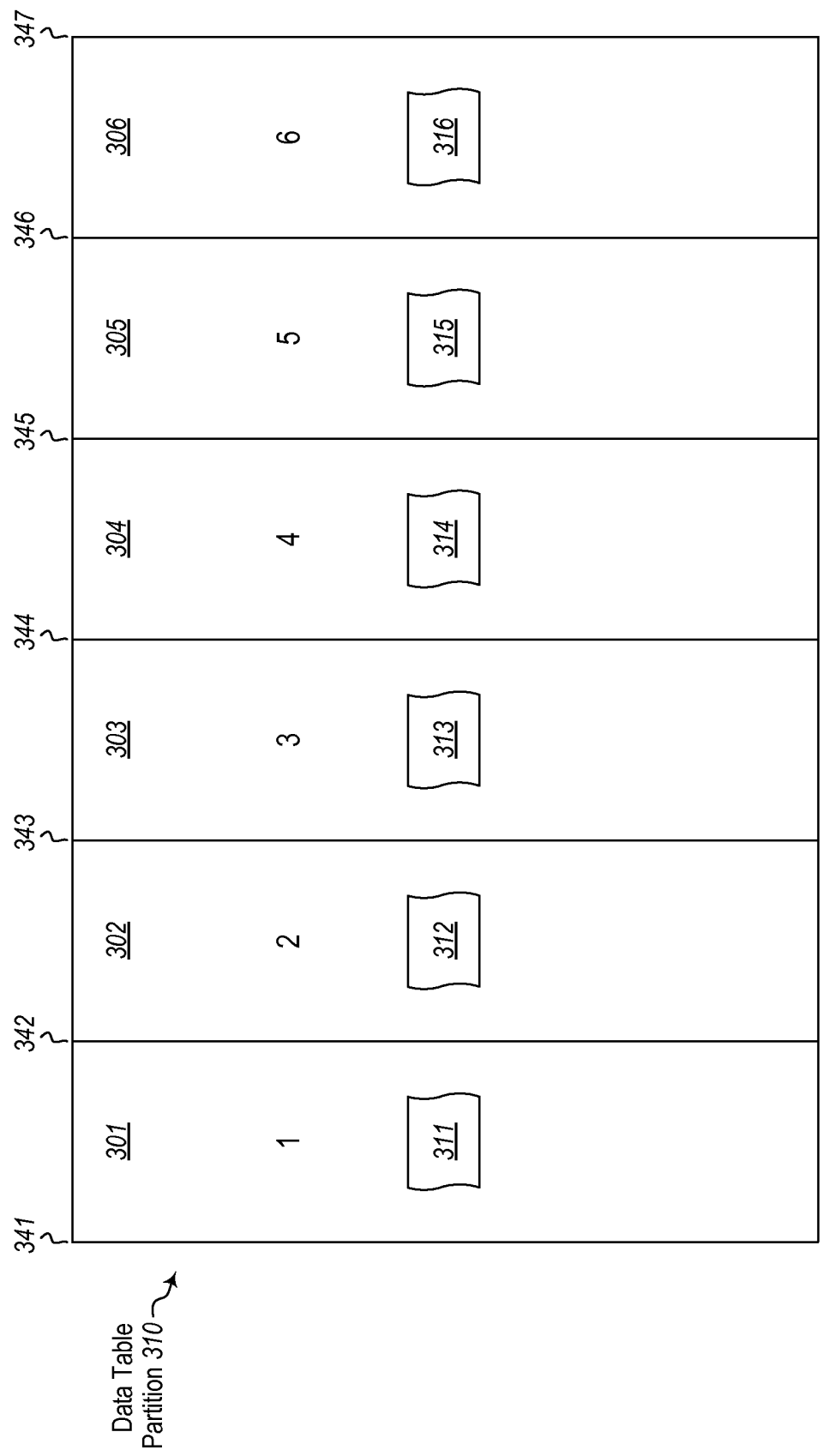
FIG. 3A illustrates an example data table partition.
Figure 3B:
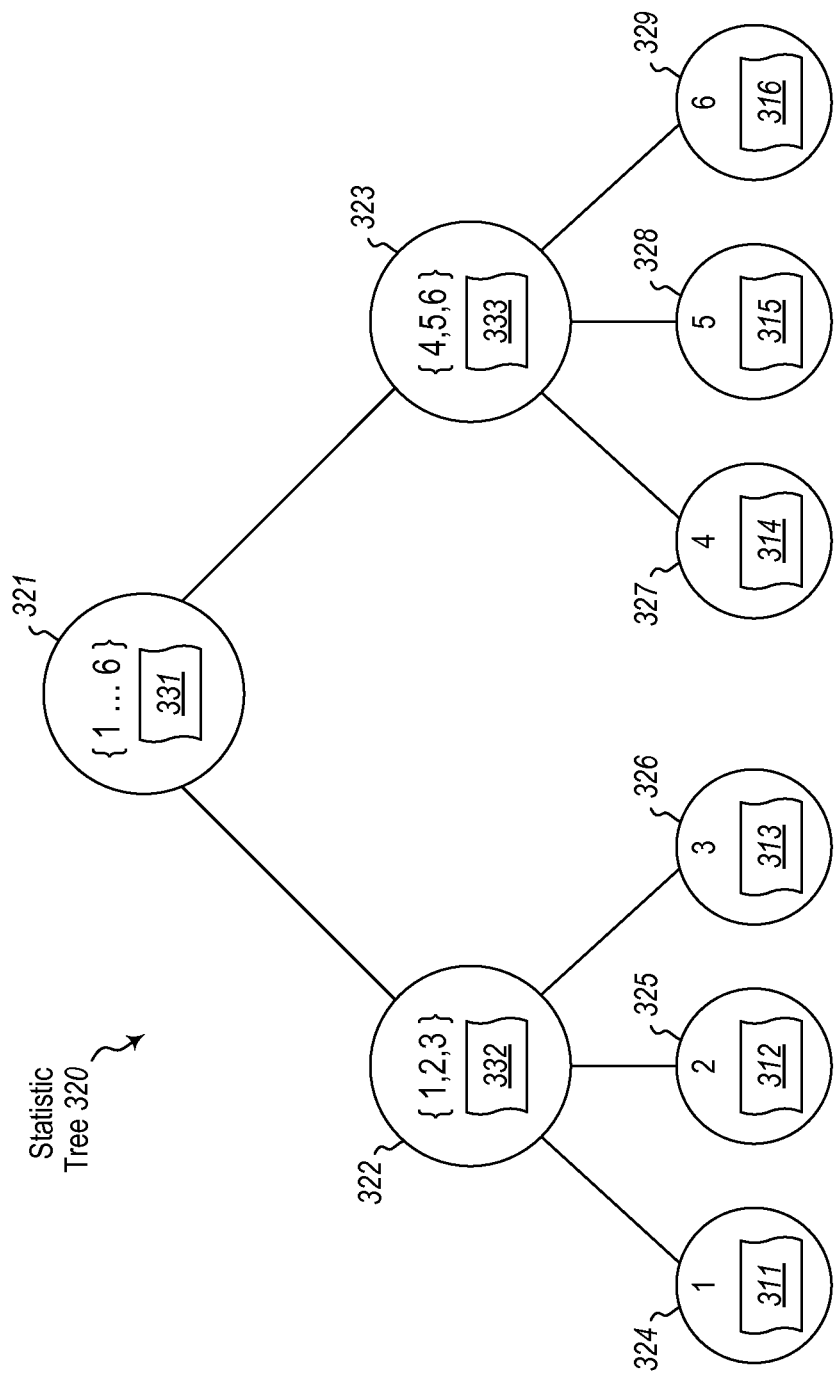
FIG. 3B illustrates an example statistics tree structure.

Attention is now given to FIGS. 3A and 3B, which illustrate an example organization of a statistics tree structure 234 in accordance with the embodiments disclosed herein. FIG. 3A illustrates an example data table partition 310. The data table partition 310 may be a partition for one of the data tables 215. As illustrated, the rows, columns, and other data of the underlying data table 215 are not included so that emphasis may be on the partition of the data table. It will be appreciated that a partition as used herein is meant to at least mean how a data table is divided into distinct, independent parts, with respect to a partition key. In some embodiments, a partition is defined as a single column of the database table.

The data table partition 310 includes a first disjoint data range 301 that corresponds to a first partition identified by "1". The first disjoint data range 301 includes a minimum boundary 341 and a maximum boundary 342. A second disjoint data range 302 corresponds to a second partition identified by "2". The second disjoint data range 302 shares the boundary 342 with the first disjoint data range 301 as a minimum boundary and has a maximum boundary 343. A third disjoint data range 303 corresponds to a third partition identified by "3". The third disjoint data range 303 shares the boundary 343 with the second disjoint data range 302 as a minimum boundary and has a maximum boundary 344. A fourth disjoint data range 304 corresponds to a fourth partition identified by "4". The fourth disjoint data range 304 shares the boundary 344 with the third disjoint data range 303 as a minimum boundary and has a maximum boundary 345. A fifth disjoint data range 305 corresponds to a fifth partition identified by "5". The fifth disjoint data range 305 shares the boundary 345 with the fourth disjoint data range 304 as a minimum boundary and has a maximum boundary 346. A sixth disjoint data range 306 corresponds to a sixth partition identified by "6". The sixth disjoint data range 306 shares the boundary 346 with the fifth disjoint data range 305 as a minimum boundary and has a maximum boundary 347. It will be appreciated that the data ranges 301-306 are disjoint data ranges since they do not have overlapping data.

The data table partition 310 also shows a corresponding statistic, which may correspond to one of the statistics 216, for each of the partitions. For example, a statistic 311 corresponds to the partition 1, a statistic 312 corresponds to the partition 2, a statistic 313 corresponds to the partition 3, a statistic 314 corresponds to the partition 4, a statistic 315 corresponds to the partition 5, and a statistic 316 corresponds to the partition 6. These statistics may be statistics that were previously generated and are stored in the statistics repository 211 or they may be generated at the time of the organization. It will be appreciated that the statistics 311-316 would not typically be part of the underlying data table 215 of the data table partition 310. However, the statistics 311-316 have been included here for ease of illustration in showing which statistics correspond to which partition.

Turning to FIG. 3B, a statistics tree structure 320, which corresponds to the statistics tree structure 234, is illustrated. The statistics tree structure 320 illustrates a one-to-one mapping of the partitions shown in FIG. 3A. This is done for ease of illustration. It will be appreciated, however, that the statistics tree structure 320 need not be one-to-one mapping as other valid mappings of contiguous partitions are also possible.

The statistics tree structure 320 includes a root node 321. The root node 321 corresponds to a global statistic 331. The global statistic 331 includes a disjoint union of all the statistics for the partitions 1-6 as illustrated by {1 ... 6}.

The statistics tree structure 320 includes two internal nodes 322 and 323 that are also children nodes of the root node 321. The internal node 322 corresponds to an incremental summary statistic 332. The incremental summary statistic 332 includes a disjoint union of all the statistics for the contiguous partitions 1, 2, and 3 as illustrated by {1, 2, 3}. The internal node 323 corresponds to an incremental summary statistic 333. The incremental summary statistic 333 includes a disjoint union of all the statistics for the contiguous partitions 4, 5, and 6 as illustrated by {4, 5, 6}.

The statistics tree structure 320 includes six leaf nodes 324-329. The leaf nodes 324-326 are children nodes of the internal node 322 and the leaf nodes 327-329 are children nodes of the internal node 323. The leaf node 324 corresponds to the statistic 311 of partition 1, the leaf node 325 corresponds to the statistic 312 of partition 2, the leaf node 326 corresponds to the statistic 313 of partition 3, the leaf node 327 corresponds to the statistic 314 of partition 4, the leaf node 328 corresponds to the statistic 315 of partition 5, and the leaf node 329 corresponds to the statistic 316 of partition 6.

It will be appreciated that the statistics tree structure 320 is based on the disjoint data ranges 301-306 and not partition ranges. That is, the boundaries 341-347 of the partition are defined by the data ranges. Accordingly, this means that that the statistics tree structure 320 (and corresponding statistics tree structure 234) may be independent of the schema of the of the underlying data table 215. In some embodiments, however, the database management system may enforce certain rules relating to the schema of the underlying data table 215, for example that the leaf nodes must cover only full partitions after a merge.

As mentioned above, the statistics tree structure 320 may have associated tree parameters 235 that specify the number of nodes that may be included in the statistics tree structure 320. It will be appreciated that the statistics tree structure 320 may have at least a CPN of three and a LC of six since there are three children nodes for each internal node 322 and 323 and a total of six leaf nodes 324-329.

Returning to FIG. 2, the query optimizer 220 includes a statistics tree transformation module 240. In operation, the statistics tree transformation module 240 performs various transformation operations on the statistics tree structure 234. These transformation operations transform the statistics tree structure 234 into a form that at least partially minimizes the system resources needed to update the statistics 216 corresponding to the nodes of the statistics tree structure 234. Alternatively, the transformation operations transform the statistics tree structure 234 when at least one of the disjoint ranges of data 301-306 of a data table is changed. Examples of the transformation operations will now be explained.

Figure 4:
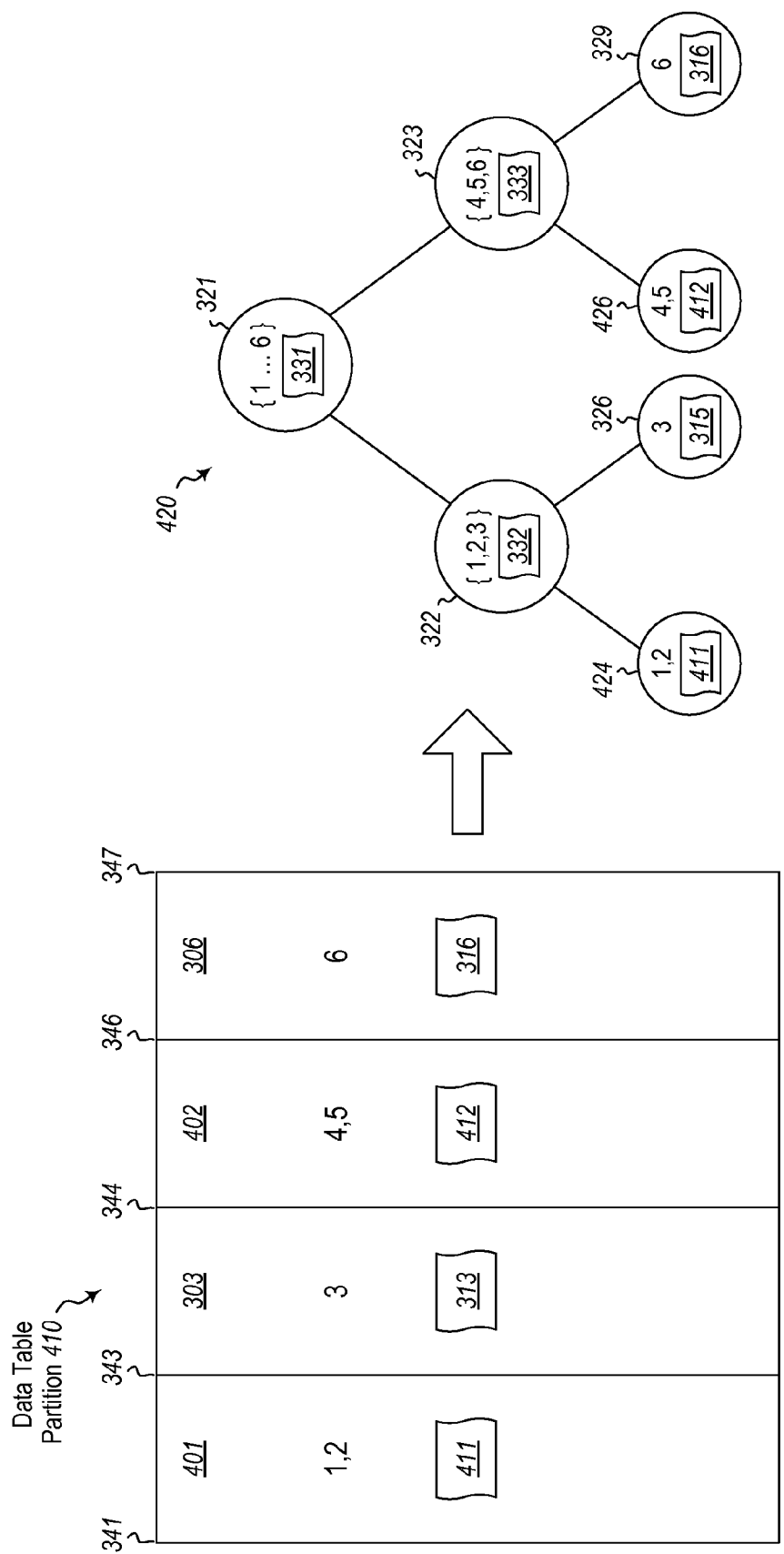
FIG. 4 illustrates an example transformation operation that merges one or more contiguous leaf nodes.

Attention is given to FIG. 4, which illustrates a transformation operation that merges one or more leaf nodes when contiguous disjoint data ranges corresponding to the leaf nodes have been merged. FIG. 4 illustrates a data partition table 410 that is a merged version of the data partition table 310 discussed in relation to FIG. 3. As shown, the data partition table 410 shows a first data range 401 that corresponds to a partition 1,2 that represents a physical merger of the partitions 1 and 2 of data partition table 310. That is, the data in the partitions 1 and 2 have been merged to form a single data range 401 and partition. In other words, the data in the underlying data table 215 has been merged so that the maximum boundary of partition 1 and the minimum boundary of partition 2 is no longer boundary 342. Rather, the minimum boundary of the merged partition is now boundary 341 and the maximum boundary is boundary 343. That is, the boundary 342 is no longer a valid boundary for the partitions 1 and 2 since the boundary 342 is no longer part of the subset of boundaries between the partitions in the underlying data table.

The data partition table 410 also shows a second data range 402 that corresponds to a partition 4,5 that represents the merger of the partitions 4 and 5 of the data partition table 310. That is, the data in the partitions 4 and 5 have been merged to form a single data range 402 and partition. In other words, the data in the underlying data table 215 has been merged so that the maximum boundary of partition 4 and the minimum boundary of partition 5 is no longer boundary 345. Rather, the minimum boundary of the merged partition is now boundary 344 and the maximum boundary is boundary 346. That is, the boundary 345 is no longer a valid boundary for the partitions 4 and 5 since the boundary 345 is no longer part of the subset of boundaries between the partitions in the underlying data table.

A statistic 411 corresponds to the disjoint union or merger of the statistics 311 and 312. A statistic 412 corresponds to the disjoint union or merger of the statistics 314 and 315. The partitions 3 and 6 and their corresponding statistics 313 and 316 are unchanged from the data partition table 310 since these partitions are unchanged.

FIG. 4 also shows a statistics tree structure 420 that is transformed from the statistics tree structure 320 by the transformation operation that merges one or more leaf nodes when the disjoint data ranges corresponding to the leaf nodes have been merged. As shown, statistics tree structure 420 includes the root node 321 and the two internal nodes 322 and 323 previously discussed. These nodes are unchanged since the merger only affected descendant nodes and thus the statistics corresponding to these nodes do not need to change. In addition, FIG. 4 shows that the leaf nodes 326 and 329 are unchanged from the statistics tree structure 320.

Statistics tree structure 420, however, has a new leaf node 424, which is a child node of internal node 322. The leaf node 424 corresponds to the merged statistic 411 of the merged contiguous partitions 1,2. The statistics tree structure 420 also includes another new leaf node 426, which is a child node of internal node 323. The leaf node 426 corresponds to the merged statistic 412 of the merged contiguous partitions 4,5. Accordingly, this transformation operation ensures that a statistics tree structure 234, and therefore the corresponding statistics 216, matches up with the actual partition of the underlying data table 215.

It will be appreciated that although the embodiment described in relation to FIG. 4 shows that the statistics tree structure 420 is dependent on the data table 410, this is for ease of illustration only and need not be the case. In some embodiments, the query optimizer may determine to merge two or more leaf nodes to thereby cause the merger of two or more contiguous disjoint data ranges.

In addition, there may be circumstances where a change in the physical partitions does not cause a corresponding change to the statistics tree structure or a change in the statistics tree structure does not cause a change in the physical partitions. For example, if a leaf node included the partition 1,2 and then this partition was split into partition 1 and partition 2, there may not be any change to the statistics tree structure since the leaf node including the partition 1,2 already includes the minimum and maximum boundaries for the data ranges of these partitions. In other words, the minimum and maximum data range boundaries of the partition 1 and the partition 2 are subsets of the data range boundaries for the partition 1,2. Thus, the physical partition and the corresponding statistics tree structure are dependent on the underlying data ranges of the data table.

Returning to FIG. 2, the statistics tree transformation module 240 may include or have access to a cost function 245 that is used by a transformation operation to shuffle partitions among the leaf nodes to thereby optimize the number of leaf nodes of the statistics tree structure so that the leaf nodes will have an approximately equal recomputation cost for their corresponding statistics. As will be appreciated, the recomputation cost for each node may not be equal. For example, some nodes may have a larger amount of data corresponding to their statistics while other nodes may have a statistic that has not been updated for a longer period of time. Accordingly, the statistics tree transformation module 240 may use the cost function 240 to determine a recomputation cost for each leaf node of the statistics tree structure 234. The number and arrangement of the leaf nodes may then be optimized so that the recomputation cost of each leaf node is approximately equal or sufficiently equal in those embodiments where a achieving a specified recomputation cost is acceptable. It will be appreciated that the optimized number and arrangement of the leaf nodes may not violate the parameters CPN and LC (or any other parameters 235). It will be appreciated that recomputation cost as used herein may refer to the initial recomputation cost of a node and may also refer to the estimated future recomputation costs based on a probability of the node being updated or any combination of the two.

In one embodiment, the cost function 245 is N+kT, where N is the number of rows or other data of the underlying data table 215, T is the number of changes to the data of the underlying data table 215 since a last statistics update, and k is constant based on data management system 200 resources. In this cost function, N is proportional to the recomputation cost since a larger number of rows or data will typically consume more resources for a statistics update. The value of T is related to a probability that an update will occur for a given partition since the longer it has been since the last update the more likely it will be that an update will occur. In some embodiments, the value for T may be determined by the counter 217 as previously described. A low value of k will attempt to minimize future costs of recomputation and a high k will attempt to minimize the probability that any updates need occur.

Figure 5A:
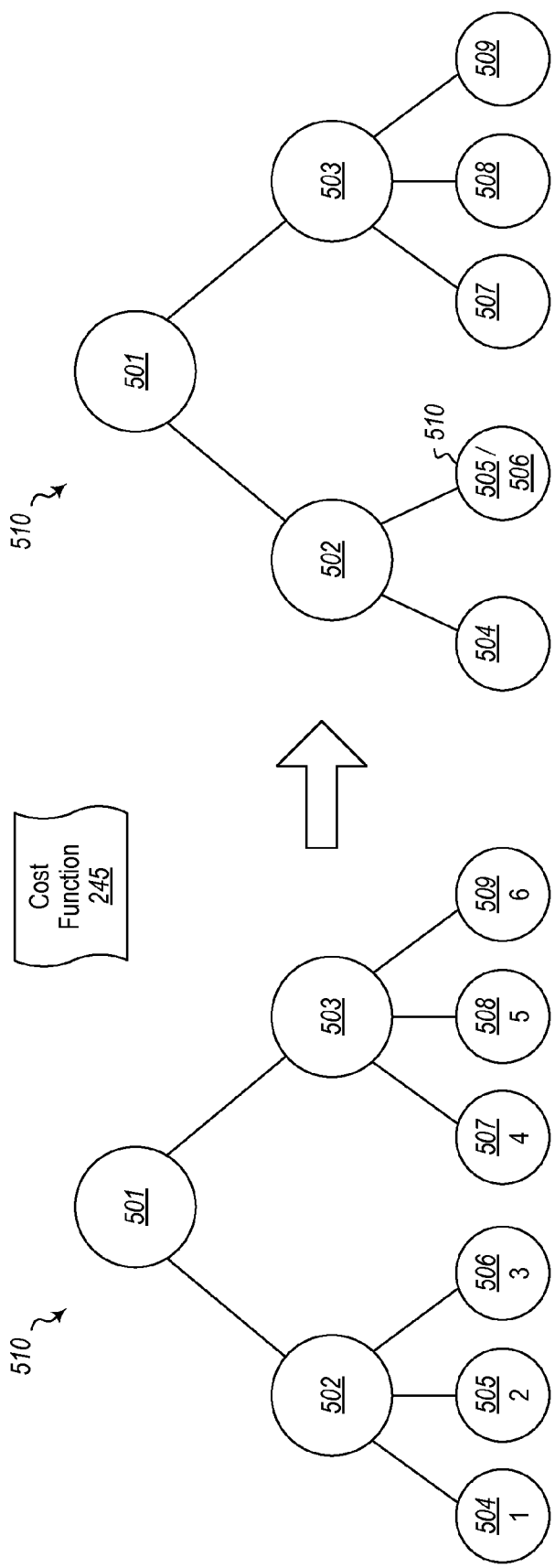
FIGS. 5A and 5B illustrate an example transformation operation that rearranges contiguous ranges of physical partitions among leaf nodes based on a cost function.

Attention is now given to FIG. 5A, which illustrates an embodiment of a transformation function that shuffles partitions among the leaf nodes of the statistics tree structure so that the leaf nodes will have an approximately or sufficiently equal recomputation cost. FIG. 5 shows a statistics tree structure 510, which may correspond to the statistic trees 234 or 320 previously discussed, prior to the cost function 245 being applied. The statistics tree structure 510 includes a root node 501, internal nodes 502 and 503, and leaf nodes 504-509 that are related to partitions 1-6 respectively of an underlying data table 215 as has been previously discussed.

In operation the cost function 245 is applied to the statistics tree structure 510 to determine a recomputation cost for each node. A determination is then made by the query optimizer 220 if the recomputation cost of a leaf node is a high cost or is a low cost. If the recomputation cost is a low cost, the leaf node may be merged with one or more other low cost leaf nodes to create a new leaf node that has a higher recomputation cost than the nodes that were merged to create the new leaf node. If the recomputation cost of the leaf node is a high cost, then the node may be split into two or more leaf nodes that each have a lower recomputation cost than the leaf node that was split to create them.

Suppose that due to a change in the partitions of the underlying data table or some other reason such as a user determination or available system resources, the query optimizer determines that only five leaf nodes can now be supported by the statistics tree structure 510. In this situation, two of the leaf nodes will need to merge into a single leaf node so that only five leaf nodes are used. As will be appreciated, nodes 504 and 505 can be merged, nodes 505 and 506 can be merged, nodes 506 and 507 can be merged, nodes 507 and 508 can be merged, and nodes 508 and 509 can be merged.

To determine which of the two nodes should be merged, the recomputation cost of each node is determined as previously described. FIG. 5A is an illustration showing that nodes 505 and 506 were found to have the lowest recomputation costs and so have been merged into a new node shown at 510. Thus, statistics tree structure 510 now has five leaf nodes.

It will be appreciated that the merger of nodes 505 and 506 to reach the allowed five leaf nodes may be changed. For example, suppose that a large amount of data is added to the partitions 2 and 3 corresponding to the nodes 505 and 506 in the underlying data table. In such a case, the query optimizer 220 may determine that nodes 505 and 506 should no longer be merged and that two other nodes should be merged to arrive at the five allowed leaf nodes. Accordingly, the node 510 may be split back into individual nodes 505 and 506. In addition, the two nodes with the lowest recomputation cost other than nodes 505 and 506 may be determined and then merged so that five leaf nodes are maintained.

Figure 5B:
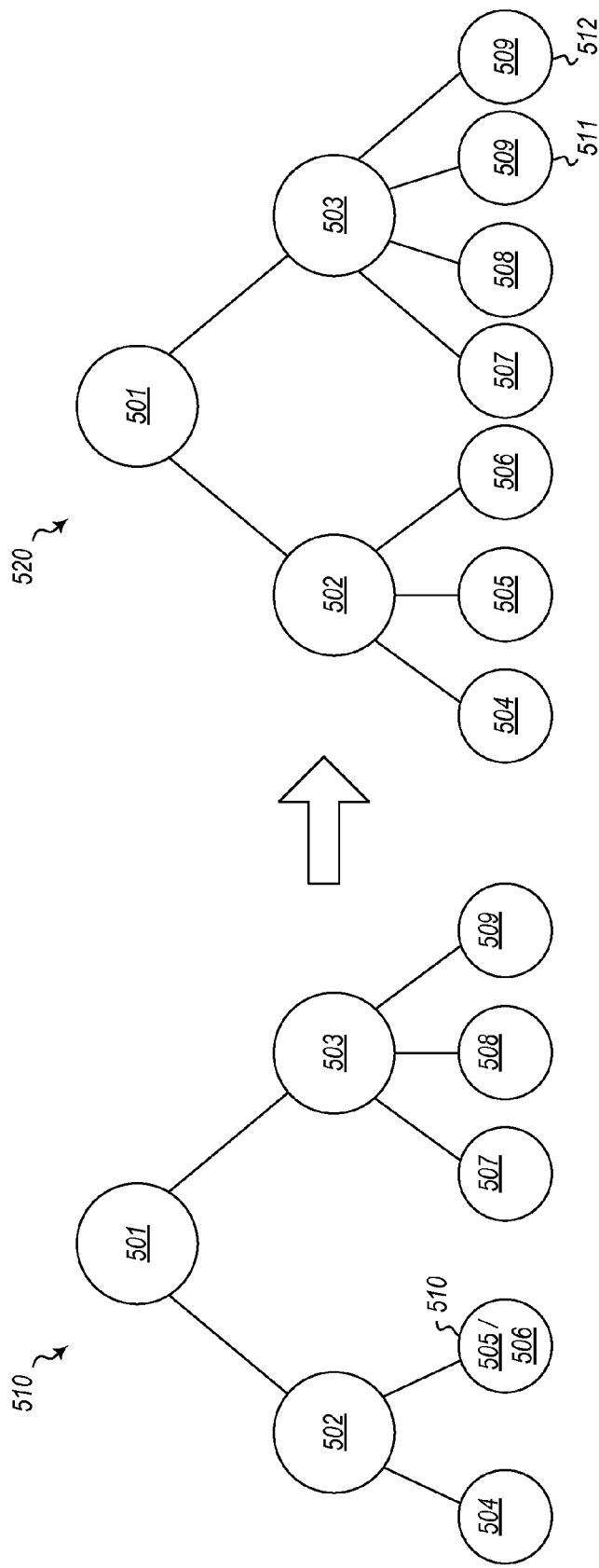

Suppose that the query optimizer 220 later determines that six leaf nodes can be supported. In such a case, for the example of FIG. 5A, the leaf node 510 would be split back into nodes 505 and 506. However, if the system determined that additional leaf nodes could be supported, then the query optimizer 220 may split additional leaf nodes. For example, suppose that the LC for the statistics tree 210 was at least seven. In such a case, the recomputation cost of each node would be determined and the node with the highest cost would be split to create at least two nodes with a lower recomputation cost. FIG. 5B shows that the node 509 has been split into two lower cost nodes 511 and 512 so that there are seven leaf nodes.

It will be appreciated that the illustrations of FIGS. 5A and 5B have been simplified to show the underlying transformation operation. In many embodiments, however, a combination of mergers and splits may occur while reshuffling the partitions among the leaf nodes. In addition, the mergers and splits need not be a two-to-one merger or a one-to-two split. For example, in an embodiment where there are seven partitions but only five leaf nodes are allowed, the system can merge two pairs of nodes to reach five leaf nodes or it can merge three leaf nodes into a single leaf node. Both would be valid ways to go from seven leaf nodes to five leaf nodes.

In one embodiment, the process of determining the recomputation cost for each leaf node and then merging low cost nodes and splitting high cost nodes will continue until a fixed point is reached where all the leaf nodes have a recomputation cost that is as close to equal as possible given the CPN and LC for the statistics tree structure. In other words, the system will continue to merge and split based on recomputation cost until there is the largest number of leaf nodes possible that have an approximately equal recomputation cost without going over the CPN and LC of the statistics tree structure. In this way the statistics tree structure is put in a form that will at least partially minimize the resource costs when updating the statistics 216 as the nodes are arranged in a manner that at least approximately equalizes recomputation costs. As mentioned, in some embodiments, the process will continue until the recomputation costs of the leaf nodes are sufficiently equal.

Returning to FIG. 2, the statistics tree transformation module 240 may also perform a transformation operation that minimizes resources needed to perform an update by balancing the statistics tree structure 234. In one embodiment, the transformation operation ensures that the height of the statistics tree 234 remains logarithmic to the number of nodes in the tree to thereby prevent a long, thin tree. In addition, the transformation operation attempts to balance the leaf nodes of the statistics tree structure to thereby minimize the need to recompute any internal or root nodes. That is, leaf nodes are moved around internal nodes in a manner that attempts to prevent any changes to root nodes or other nodes of various subtrees.

In one embodiment, the balancing transformation operation is done transforming the statistics tree structure 234 into an optimally balanced statistics tree structure 246. The optimally balanced statistics tree structure 246 is defined as a statistics tree having a balanced logarithmic height for the given CPN and LC of the statistics tree structure 234.

Figure 6:
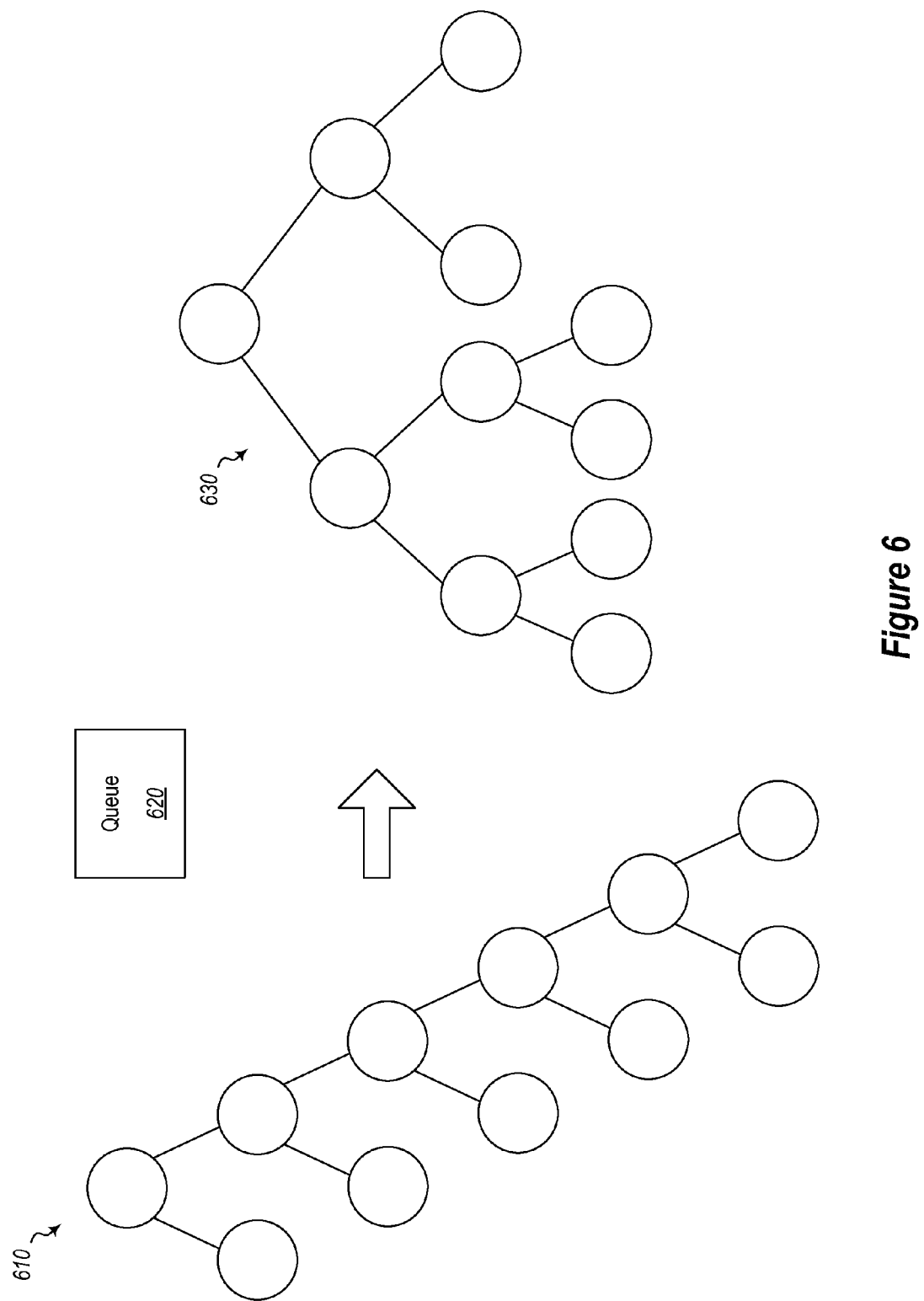
FIG. 6 illustrates an example transformation operation that balances the statistics tree structure.

FIG. 6 illustrates one embodiment of a balancing transformation operation. As illustrated, FIG. 6 shows a statistics tree structure 610 that includes a root node and various internal and leaf nodes. As illustrated, the height of the statistics tree structure 610 is not logarithmically balanced for the number of nodes of the tree as it is long and skinny.

During the balancing transformation operation, if a node has an excess of children nodes when compared to the optimally balanced statistics tree structure 246, these children nodes are added to a queue 620, which may be any reasonable memory or buffer. The children nodes in the queue 620 may then be added to those nodes that have missing children nodes when compared to the optimally balanced statistics tree structure 246. This process is repeated as needed until the statistics tree 610 has a height that is logarithmically balanced for the number of the nodes of the statistics tree given the CPN and LC of the statistics tree structure. This is illustrated in FIG. 6 as statistics tree structure 630.

Returning to FIG. 2, the query optimizer has a statistics update module 250 that performs any needed updates of the statistics 216. In one embodiment, an update policy 255 is used to determine which statistics need to be updated. For example, a depth-first traversal of the statistics tree structure 234 may be performed to determine which leaf nodes require resembling to update the statistics based on the policy 255. Since the various transformation operations have transformed the statistics tree structure as described, those statistics for which data has changed in the underlying data table 215 will be updated while those with no changes will not be updated. In other words, an incremental update will occur for those statistics where a change has occurred. In addition, the transformations will minimize the resources needed when an update does occur.

For example, if the transformation operations changed the disjoint data ranges of the data tables 215, then an update will occur. If a child is marked for an update, then the corresponding internal node will also be updated. If the transformation operations result in no changes to the statistics tree structure 234, this means that no updates are needed. Advantageously, the statistics tree structure 234 allows for an increased number of leaf nodes for each internal node and this allows for parallel updates on various sub-trees without needing to update unaffected sub-trees.

Once the incremental statistics update has been completed, the query optimizer 220 may then use the updated statistics to determine an efficient execution plan for the query 205. Since the incremental update has occurred, the statistics 216 will be sufficiently fresh.

In some embodiments, the query optimizer 220 may include a threshold module 260. In operation, the threshold module 260 accesses a threshold 265. The threshold 265 defines a minimum amount that the data of the data tables 215 needs to be changed before any statistics 216 updates need occur. In other words, the threshold module 260 acts as gatekeeper that determines if enough changes in the data have occurred to justify the resources necessary to proceed with incremental statistics update. Until the changes exceed the threshold 265, no updates will occur as the statistics 216 are deemed fresh enough to allow for the selection of an efficient execution plan.

In one embodiment, the threshold module 260 compares the threshold 265 with the counters 217 previously described. When the counters 217 indicate that the threshold 265 has been exceeded, the threshold module 260 notifies the query optimizer 220 that the statistics 216 may be organized into the statistics tree structure 234 and the transformation operations performed as previously described.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
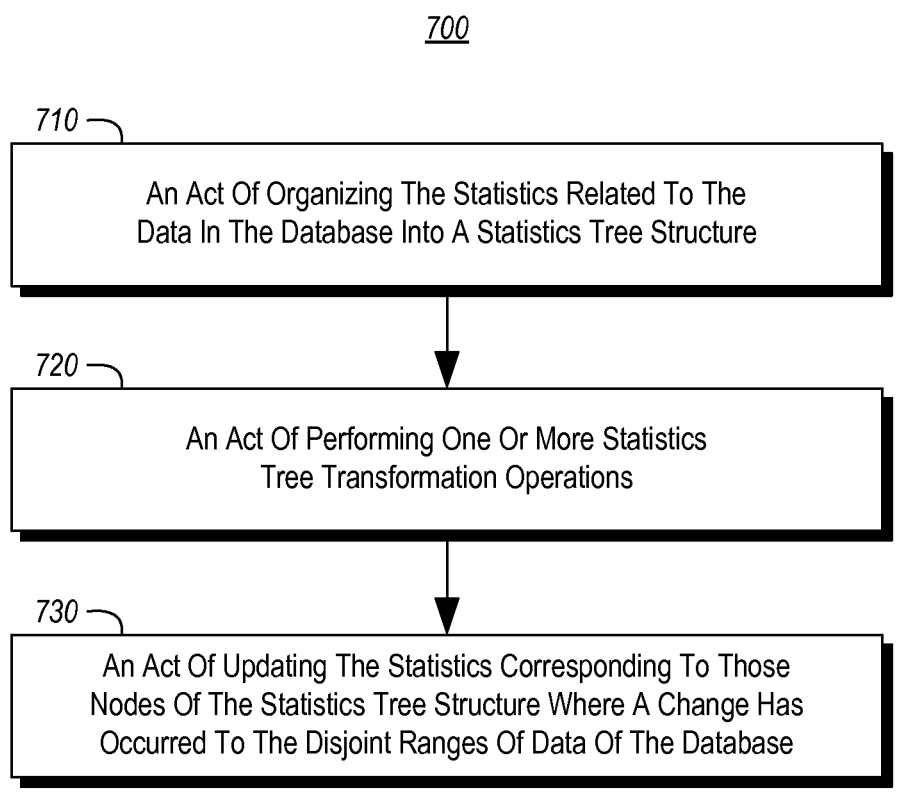
FIG. 7 illustrates a flowchart of an example method for a database management system including a query optimizer that performs query optimization based on statistics related to data in the database to incrementally update the statistics.

FIG. 7 illustrates a flow chart of an example method 700 for a database management system including a query optimizer that performs query optimization based on statistics related to data in the database to incrementally update the statistics. The method 700 will be described with respect to the database management system 200 described above.

The method 700 includes an act of organizing the statistics related to the data in the database into a statistics tree structure (act 710). The data tree structure has a root node that corresponds to one or more global statistics, one or more internal nodes that correspond to incremental summary statistics of descendant nodes, and one or more leaf nodes that correspond to one or more statistics related to disjoint data ranges in the database. For example, the statistics tree organization module 230 may organize the statistics 216 into the statistics tree structure 234. As described in relation to FIG. 3B, the statistics tree structure 320, which corresponds to the statistics tree structure 234, may have a root node 321 that corresponds to a global statistic 331 and internal nodes 322 and 323 that correspond to incremental summary statistics 332 and 333. The statistics tree structure 320 may also have leaf nodes 324-329 that correspond to statistics 311-316 that are related to disjoint data ranges of a partition 310 of an underlying data table 215. In some embodiments, the threshold module 260 determines, prior to organizing the statistics tree structure, if the statistics 216 have changed enough to justify any updates.

The method 700 includes an act of performing one or more statistics tree transformation operations that transform the statistics tree structure into a form that at least partially minimizes the system resources needed to update the statistics corresponding to one or more nodes (act 720). For example, the statistics tree transformation module 240 performs a statistics tree transformation operation on the statistics tree structure 234 to transform the statistics tree structure as previously described. The statistics tree transformation operation may be according to those described in relation to FIGS. 4-6 described above.

The method 700 includes an act of updating the statistics corresponding to those nodes of the statistics tree structure where a change has occurred to the disjoint ranges of data of the database (act 730). For example, the statistics update module 250 may update the statistics 216 corresponding to the statistics tree structure 234 in the manner previously described.

Figure 8:
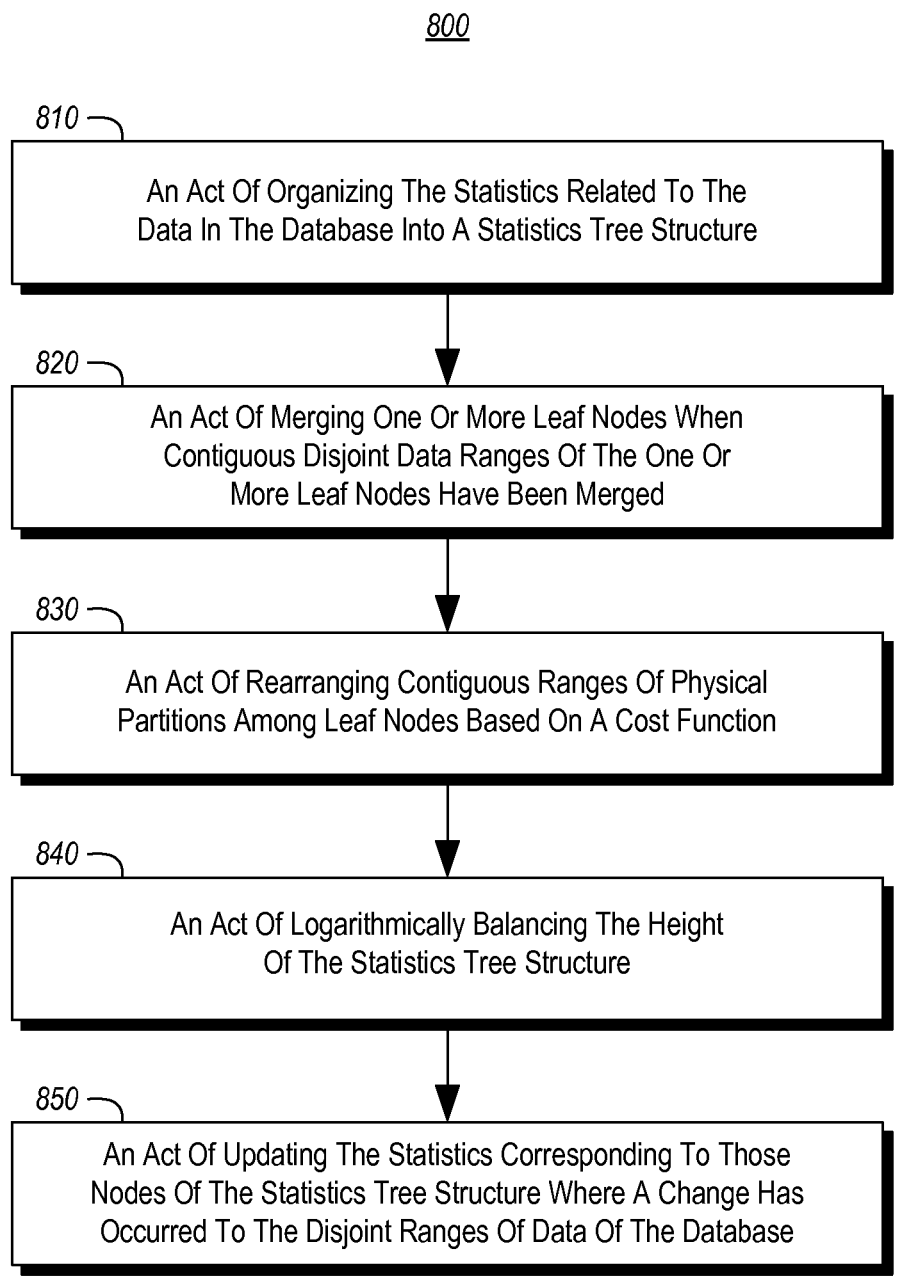
FIG. 8 illustrates a flowchart of an alternative method for a database management system including a query optimizer that performs query optimization based on statistics related to data in the database to incrementally update the statistics.

FIG. 8 illustrates a flow chart of an example method 800 for a database management system including a query optimizer that performs query optimization based on statistics related to data in the database to incrementally update the statistics. The method 800 will be described with respect to the database management system 200 described above.

The method 800 includes an act of organizing the statistics related to the data in the database into a statistics tree structure (act 810). The data tree structure has a root node that corresponds to one or more global statistics, one or more internal nodes that correspond to incremental summary statistics of descendant nodes, and one or more leaf nodes that correspond to one or more statistics related to disjoint data ranges in the database. For example, the statistics tree organization module 230 may organize the statistics 216 into the statistics tree structure 234. As described in relation to FIG. 3B, the statistics tree structure 320, which corresponds to the statistics tree structure 234, may have a root node 321 that corresponds to a global statistic 331 and internal nodes 322 and 323 that correspond to incremental summary statistics 332 and 333. The statistics tree structure 320 may also have leaf nodes 324-329 that correspond to statistics 311-316 that are related to disjoint data ranges of a partition 310 of an underlying data table 215. In some embodiments, the threshold module 260 determines, prior to organizing the statistics tree structure, if the statistics 216 have changed enough to justify any updates.

The method 800 includes an act of merging one or more leaf nodes when contiguous disjoint data ranges corresponding to the one or more leaf nodes have been merged (act 820). An example of the act 820 will be described in relation to a method 900 of merging one or more leaf nodes when the disjoint data ranges corresponding to the one or more leaf nodes have been merged as illustrated in FIG. 9.

The method 900 includes an act of determining that a first disjoint data range of the database has been merged with a second contiguous disjoint data range of the database to thereby create a third disjoint data range of the database (act 910). For example, as shown in FIGS. 3 and 4, the contiguous disjoint data ranges 301 and 302 corresponding to the partitions 1 and 2 are merged to create a new disjoint data range 401 corresponding to the partition 1,2. Likewise, the contiguous disjoint data ranges 304 and 305 corresponding to the partitions 4 and 5 are merged to create a new disjoint data range 402 corresponding to the partition 4,5.

The method 900 includes an act of merging a first leaf node corresponding to the first disjoint data range with a second leaf node corresponding to the second disjoint data range to thereby create a third leaf node that corresponds to one or more statistics related to the third disjoint data range (act 920). For example, as shown in FIGS. 3 and 4, the leaf nodes 324 and 325 are merged to create a new leaf node 424 that corresponds to a statistic 411 that is the result of the merger of the statistics 311 and 312. Likewise, the leaf nodes 327 and 328 are merged to create a new leaf node 426 that corresponds to a statistic 412 that is the result of the merger of the statistics 314 and 315.

Figure 10:
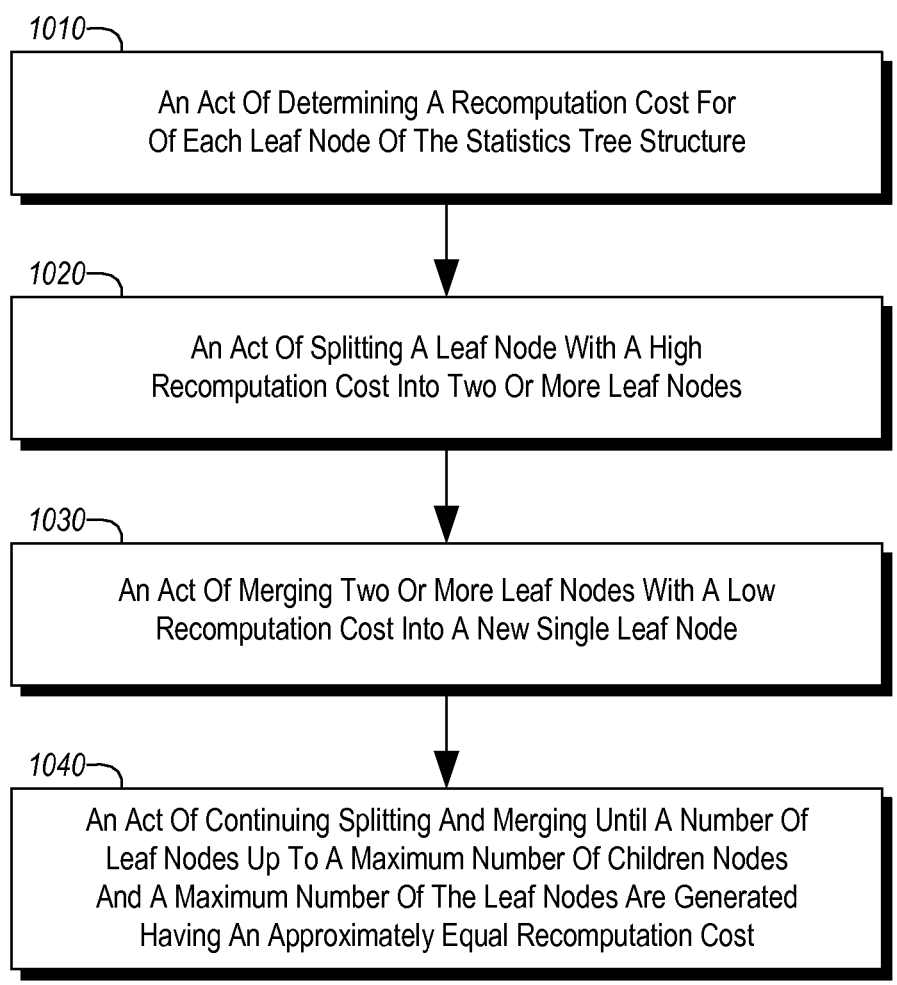
FIG. 10 illustrates a flowchart of an example method of rearranging contiguous ranges of physical partitions among leaf nodes based on a cost function.

Returning to the method 800, the method 800 also includes an act of rearranging contiguous ranges of physical partitions leaf nodes based on a cost function (act 830). An example of the act 830 will be described in relation to a method 1000 of rearranging leaf nodes based on a cost function as illustrated in FIG. 10.

The method 1000 includes an act of determining, based on a cost function, a recomputation cost for updating the statistics of each corresponding leaf node of the statistics tree structure (act 1010). For example, a cost function 245 may be applied to the leaf nodes of the statistics tree structure 234 to determine a recomputation cost for each leaf node as described above. In one embodiment, the cost function may be N+kT, where N is a number of rows in a disjoint range of data in the database corresponding to a leaf node, T is a number of changes to the disjoint range of data in the database since a last statistics update, and k is a constant based on system resources.

The method 1000 includes an act of splitting a leaf node with a high recomputation cost into two or more leaf nodes that each have a lower recomputation cost than the leaf nodes that are split (act 1020). For example, as shown in FIG. 5B the leaf node 509 may have a high recomputation cost. Accordingly, the leaf node 509 is split into a leaf node 511 and a leaf node 512 that each have a lower recomputation cost than the leaf node 509.

The method 1000 includes an act of merging two or more leaf nodes with a low recomputation cost into a new single leaf node that has a higher recomputation cost than the leaf nodes that are merged (act 1030). For example, as shown in FIG. 5A the leaf nodes 505 and 506 may have a low recomputation cost. Accordingly, these leaf nodes are merged to create a new leaf node 510 that has a higher recomputation cost than the leaf nodes 505 and 506.

The method 1000 includes an act of continuing the acts of splitting and merging until a number of leaf nodes up to the maximum number of children nodes and the maximum number of the leaf nodes are generated having an approximately equal recomputation cost (act 1040). For example, the process of splitting and merging is continued until a number of leaf nodes that does not violate the CPN and LC of the statistics tree structure are formed that have approximately equal recomputation costs as previously described.

Figure 11:
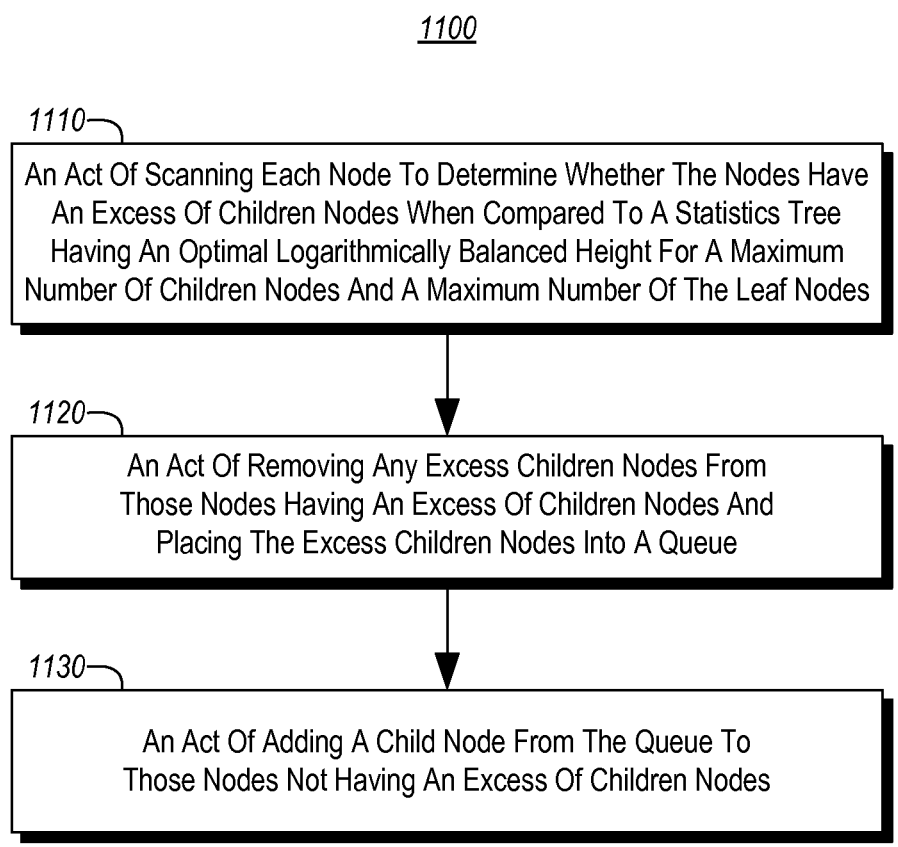
FIG. 11 illustrates a flowchart of an example method of balancing a statistics tree structure.

Returning to method 800, the method 800 includes an act of logarithmically balancing the nodes of the statistics tree structure based on a cost function (act 840). An example of the act 840 will be described in relation to a method 1100 of balancing the leaf nodes of the statistics tree structure as illustrated in FIG. 11.

The method 1100 includes an act of scanning each node to determine whether the nodes have an excess of children nodes when compared to a statistics tree structure having an optimal logarithmically balanced height for the maximum number of children nodes and the maximum number of the leaf nodes (act 1110). For example, the query optimizer may scan the nodes of the statistics tree structure 234 to determine excess children nodes when compared to the optimally balanced statistics tree structure 246 for the given CPN and LC of the statistics tree structure 234 as previously described.

The method 1100 includes an act of removing any excess children nodes from those nodes having an excess of children nodes and placing the excess children nodes into a queue (act 1120). For example, as shown in FIG. 6, any excess children nodes of the statistics tree structure 610 are placed in the queue 620.

The method 1100 includes an act of adding a child node from the queue to those nodes not having an excess of children nodes (act 1130). For example, as shown in FIG. 6 the excess children nodes are added from the queue 630 to the statistics tree structure 630 to thereby logarithmically balance the height of the statistics tree structure 630.

Returning to method 800, the method 800 includes an act of updating the statistics corresponding to those nodes of the statistics tree structure where a change has occurred to the disjoint data ranges of the database (act 850). For example, the statistics update module 250 may update the statistics 216 corresponding to the statistics tree structure 234 in the manner previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for updating statistics used by a query optimizer of a database system, the query optimizer determining an execution plan used to return data for a query, wherein the execution plan is determined from statistics for data in the database system, and the computer-implemented method controlling how statistics used by the query optimizer are updated so as to conserve computing resources otherwise used to update the statistics for the data, the computer-implemented method being performed by one or more processors executing computer executable instructions for the computer-implemented method, and the computer-implemented method comprising acts of:
storing one or more data tables in a database, at least some of the data tables comprising partitions which define disjoint data ranges of data that do not overlap as between data ranges of the at least some data tables;
at least some of the disjoint data ranges having corresponding statistics information stored in a repository of the database;
accessing the stored statistics information of the database, and organizing the accessed statistics by generating a statistics tree structure having
a root node that corresponds to one or more global statistics representing a disjoint union of all statistics corresponding to all nodes of the statistics tree structure,
one or more internal nodes hierarchically positioned below the root node, and the internal nodes each corresponding to incremental summary statistics of descendant nodes the incremental summary statistics of each internal node corresponding to all nodes of the statistics tree hierarchically positioned below each internal node, and
one or more leaf nodes that correspond to one or more statistics related to each disjoint data range of the at least some data tables;
performing one or more statistics tree transformation operations that transform the statistics tree structure into a form in which the number and arrangement of nodes designed to optimize the statistics tree structure in a manner that conserves computing resources used when updating the statistics used by the query optimizer to generate an execution plan for a received query, the transformation operations for the statistics tree comprising at least one of the following:
rearranging the number and placement of one or more nodes of the statistics tree in response to a cost function applied used to determine a recomputation cost for each node, so that recomputation cost of each leaf node is approximately equal to a specified recomputation cost that is considered to be acceptable; and
rearranging the number and placement of one or more nodes of the statistics tree in response to a balancing function which results in leaf nodes being rearranged in a manner that minimizes changes to root nodes or internal nodes; and
updating only those statistics corresponding to nodes of the statistics tree structure where a change has occurred which results in changes to one or more of the disjoint data ranges of data for the at least some data tables of the database.

2. The computer-implemented method according to claim 1, wherein the statistics that are to be organized into the statistics tree structure are existing statistics that have previously be generated.

3. The computer-implemented method according to claim 1, wherein the statistics that are to be organized into the statistics tree structure are generated at the time the statistics tree structure is organized.

4. The computer-implemented method according to claim 1, wherein generating the statistics tree structure comprises:
determining a maximum number of children nodes for internal nodes based on system resources; and
determining a maximum number of leaf nodes for the entire statistics tree structure.

5. The computer-implemented method according to claim 1, further comprising:
prior to organizing the statistics into the statistics tree structure, accessing a leaf node update threshold, the leaf node threshold defining a given number of times that the disjoint data ranges may be changed before an update of the leaf node statistics should occur;
comparing an amount of times a change has occurred to the disjoint data ranges in the database to the leaf node threshold; and
organizing the statistics into the statistics tree structure when the amount of times a change has occurred is greater than the leaf node threshold.

6. The computer-implemented method according to claim 1, wherein performing one or more statistics tree transformation operations comprises:
determining that a first disjoint data range of the database has been merged with a second adjacent disjoint data range of the database to thereby create a third disjoint data range of the database; and
merging a first leaf node corresponding to the first disjoint data range with a second leaf node corresponding to the second disjoint data range to thereby create a third leaf node that corresponds to one or more statistics related to the third disjoint data range.

7. The computer-implemented method according to claim 1, wherein rearranging the number and placement of one or more nodes of the statistics tree in response to a cost function comprises:
   splitting a leaf node with a high recomputation cost into two or more leaf nodes that each have a lower recomputation cost than the leaf nodes that are split;
   merging two or more leaf nodes with a low recomputation cost into a new single leaf node that has a higher recomputation cost than the leaf nodes that are merged; and
   continuing the splitting and merging until a number of leaf nodes up to the maximum number of children nodes and the maximum number of the leaf nodes are generated having an approximately equal or sufficiently equal recomputation cost.

8. The computer-implemented method according to claim 7, wherein the cost function is equal to N+kT, where N is a number of rows in a disjoint range of data in the database corresponding to a leaf node, T is a number of changes to the disjoint range of data in the database since a last statistics update, and k is a constant based on system resources.

9. The computer-implemented method according to claim 4, wherein rearranging the number and placement of one or more nodes of the statistics tree in response to a balancing function comprises logarithmically balancing the height of the statistics tree structure given the maximum number of children nodes and the maximum number of the leaf nodes, by performing the following:
   scanning each node to determine whether each scanned node has an excess of children nodes when compared to a statistics tree structure having an optimally balanced logarithmic height for the maximum number of children nodes and the maximum number of the leaf nodes;
   removing any excess children nodes from those nodes having an excess of children nodes and placing the excess children nodes into a queue; and
   adding a child node from the queue to those nodes not having an excess of children nodes.

10. The computer-implemented method according to claim 1, wherein updating the statistics comprises performing a depth-first traversal of the transformed statistics tree structure to determine which nodes require a statistics update.

11. A computer program product comprising one or more computer-readable storage media having stored thereon computer-executable instructions that are structured such that, when executed by one or more processors associated with a query optimizer of a database management system for managing data in a database, cause the query optimizer to perform a computer-implemented method for updating statistics used by a query optimizer of a database system, the query optimizer determining an execution plan used to return data for a query, wherein the execution plan is determined from statistics for data in the database system, and the computer-implemented method controlling how statistics used by the query optimizer are updated so as to conserve computing resources otherwise used to update the statistics for the data, the computer-implemented method being performed by one or more processors executing computer executable instructions for the computer-implemented method, and wherein the computer-implemented method comprises acts of:
   storing one or more data tables in a database, at least some of the data tables comprising partitions which define disjoint data ranges of data that do not overlap as between data ranges of the at least some data tables;
   at least some of the disjoint data ranges having corresponding statistics information stored in a repository of the database;
   accessing the stored statistics information of the database, and organizing the accessed statistics by generating a statistics tree structure having
      a root node that corresponds to one or more global statistics representing a disjoint union of all statistics corresponding to all nodes of the statistics tree structure,
      one or more internal nodes hierarchically positioned below the root node, and the internal nodes each corresponding to incremental summary statistics of descendant nodes the incremental summary statistics of each internal node corresponding to all nodes of the statistics tree hierarchically positioned below each internal node, and
      one or more leaf nodes that correspond to one or more statistics related to each disjoint data range of the at least some data tables;
   performing one or more statistics tree transformation operations that transform the statistics tree structure into a form in which the number and arrangement of nodes designed to optimize the statistics tree structure in a manner that conserves computing resources used when updating the statistics used by the query optimizer to generate an execution plan for a received query, the transformation operations for the statistics tree comprising the following:
      rearranging the number and placement of one or more nodes of the statistics tree in response to a cost function applied to determine a recomputation cost for each node, so that recomputation cost of each leaf node is approximately equal to a specified recomputation cost that is considered to be acceptable; and
      rearranging the number and placement of one or more nodes of the statistics tree in response to a balancing function which results in leaf nodes being rearranged in a manner that minimizes changes to root nodes or internal nodes; and
   updating only those statistics corresponding to nodes of the statistics tree structure where a change has occurred which results in changes to one or more of the disjoint data ranges of data for the at least some data tables of the database.

12. The computer program product in accordance with claim 11, wherein performing one or more statistics tree transformation operations:
   determining that a first disjoint data range of the database has been merged with a second contiguous disjoint data range of the database to thereby create a third disjoint data range of the database; and
   merging a first leaf node corresponding to the first disjoint data range with a second leaf node corresponding to the second disjoint data range to thereby create a third leaf node that corresponds to one or more statistics related to the third disjoint data range.

13. The computer program product in accordance with claim 11, wherein rearranging the number and placement of one or more nodes of the statistics tree in response to a cost function comprises:
   splitting a leaf node with a high recomputation cost into two or more leaf nodes that each have a lower recomputation cost than the leaf nodes that are split;
   merging two or more leaf nodes with a low recomputation cost into a new single leaf node that has a higher recomputation cost than the leaf nodes that are merged; and continuing the splitting and merging until a number of leaf nodes up to the maximum number of children nodes and the maximum number of the leaf nodes are generated having an approximately equal or sufficiently equal recomputation cost.

14. The computer program product in accordance with claim 13, wherein the cost function is equal to N+kT, where N is a number of rows in a disjoint range of data in the database corresponding to a leaf node, T is a number of changes to the disjoint range of data in the database since a last statistics update, and k is a constant based on system resources.

15. The computer program product in accordance with claim 11, wherein rearranging the number and placement of one or more nodes of the statistics tree in response to a balancing function comprises logarithmically balancing the height of the statistics tree structure comprises for a given maximum number of children nodes for the internal nodes and for a given maximum number of the leaf nodes for the entire statistics tree structure by performing the following:
 scanning each node to determine whether each scanned node has an excess of children nodes when compared to a statistics tree structure having an optimally balanced logarithmic height for the maximum number of children nodes and the maximum number of the leaf nodes;
 removing any excess children nodes from those nodes having an excess of children nodes and placing the excess children nodes into a queue; and
 adding a child node from the queue to those nodes not having an excess of children nodes.

16. The computer program product in accordance with claim 11, wherein updating the statistics comprises performing a depth-first traversal of the transformed statistics tree structure to determine which nodes require a statistics update.

17. The computer program product in accordance with claim 11, further comprising:
 prior to organizing the statistics into the statistics tree structure, accessing a leaf node update threshold, the leaf node threshold defining a given number of times that the disjoint data ranges may be changed before an update of the leaf node statistics should occur;
 comparing an amount of times a change has occurred to the disjoint data ranges in the database to the leaf node threshold; and
 organizing the statistics into the statistics tree structure when the amount of times a change has occurred is greater than the leaf node threshold.

18. A system, the system comprising:
 a database storing one or more data tables, at least some of the data tables comprising partitions which define disjoint data ranges of data that do not overlap as between data ranges of the at least some data tables;
 a statistics repository, and at least some of the disjoint data ranges having corresponding statistics information stored in the repository;
 one or more processors configured to provide;
  a query optimizer for determining an execution plan used to return data for a query, wherein the execution plan is determined from statistics stored in the repository, and wherein the query optimizer is configured to provide:
  a statistics tree organization module configured to perform the following:
   access the stored statistics information of the database, and organize the accessed statistics by generating a statistics tree structure having
    a root node that corresponds to one or more global statistics representing a disjoint union of all statistics corresponding to all nodes of the statistics tree structure,
    one or more internal nodes hierarchically positioned below the root node, and the internal nodes each corresponding incremental summary statistics of descendant nodes the incremental summary statistics of each internal node corresponding to all nodes of the statistics tree hierarchically positioned below each internal node, and
    one or more leaf nodes that correspond to one or more statistics related to each disjoint data range of the at least some data tables; the database;
  a statistics tree transformation module configured to perform the following:
   one or more statistics tree transformation operations that transform the statistics tree structure into a form in which the number and arrangement of nodes designed to optimize the statistics tree structure in a manner that conserves computing resources used when updating the statistics used by the query optimizer to generate an execution plan for a received query, the transformation operations for the statistics tree comprising the following:
   rearranging the number and placement of one or more nodes of the statistics tree in response to a cost function applied to determine a recomputation cost for each node, so that recomputation cost of each leaf node is approximately equal to a specified recomputation cost that is considered to be acceptable; and
   rearranging the number and placement of one or more nodes of the statistics tree in response to a balancing function which results in leaf nodes being rearranged in a manner that minimizes changes to root nodes or internal nodes; and
  a statistics update module configured to perform the following:
   update only those statistics corresponding to nodes of the statistics tree structure where a change has occurred which results in changes to one or more of the disjoint data ranges of data for the at least some data tables of the database.

19. The system in accordance with claim 18, wherein the statistics that are to be organized into the statistics tree structure are existing statistics that have previously be generated and that are stored in the statistics repository.

20. The system in accordance with claim 18, wherein the statistics that are to be organized into the statistics tree structure are generated at the time the statistics tree structure is organized.

* * * * *